Dec. 15, 1931.                D. BROWN                1,837,013

RESILIENT SUSPENSION FOR MOTOR ROAD VEHICLES AND THE LIKE

Filed Aug. 24, 1929        2 Sheets-Sheet 1

Donald Brown
INVENTOR.
BY Toulmin & Toulmin
ATTORNEYS.

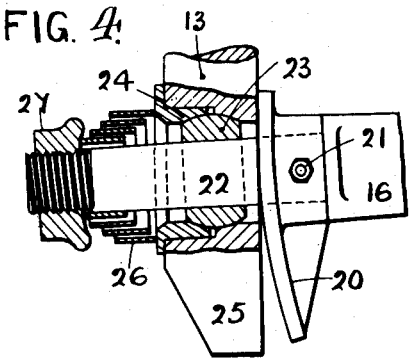
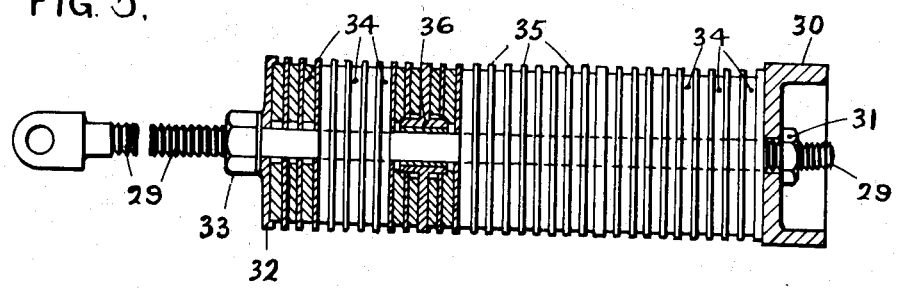
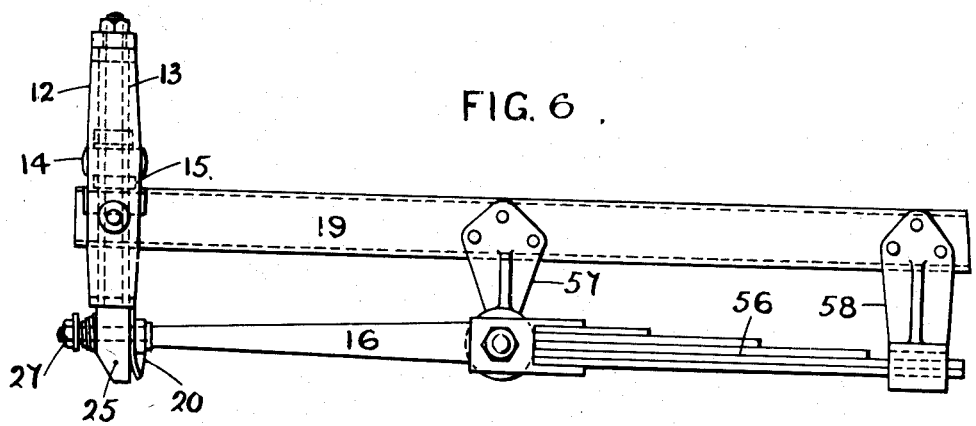

Patented Dec. 15, 1931

1,837,013

UNITED STATES PATENT OFFICE

DONALD BROWN, OF HEATON, NEWCASTLE-UPON-TYNE, ENGLAND

RESILIENT SUSPENSION FOR MOTOR ROAD VEHICLES AND THE LIKE

Application filed August 24, 1929, Serial No. 388,102, and in Great Britain August 31, 1928.

This invention relates to resilient suspensions for motor road vehicles and the like, and has for its object to provide an improved construction.

According to this invention, each of the road wheels of the vehicle is independently resiliently suspended, the lateral strains on the wheels being taken by transverse members anchored at one end to the chassis frame and attached at their other ends to the stub axles or king pins of the wheels, and the stub axles of the front wheels and the universally connected articulating axles of the rear wheels are connected to arms attached to cranks journalled on the chassis frame, abutments on rods attached to the other ends of said cranks bearing on the ends of resilient devices the other ends of which bear against abutments on the chassis frame. The abutments on the rods are preferably adjustable. The resilient devices may comprise series of rubber members, springs or pneumatic shock-absorbing devices, and lift-retarding devices are associated therewith to take the weight of the unsprung load when the chassis develops an upward movement.

Figure 1:
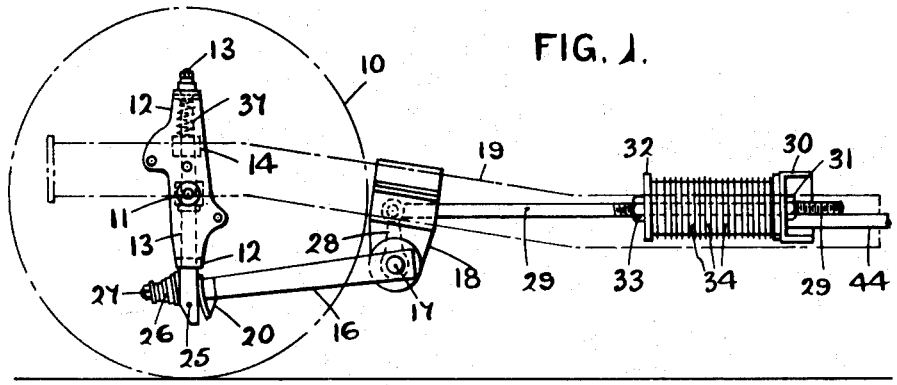
Figure 2:
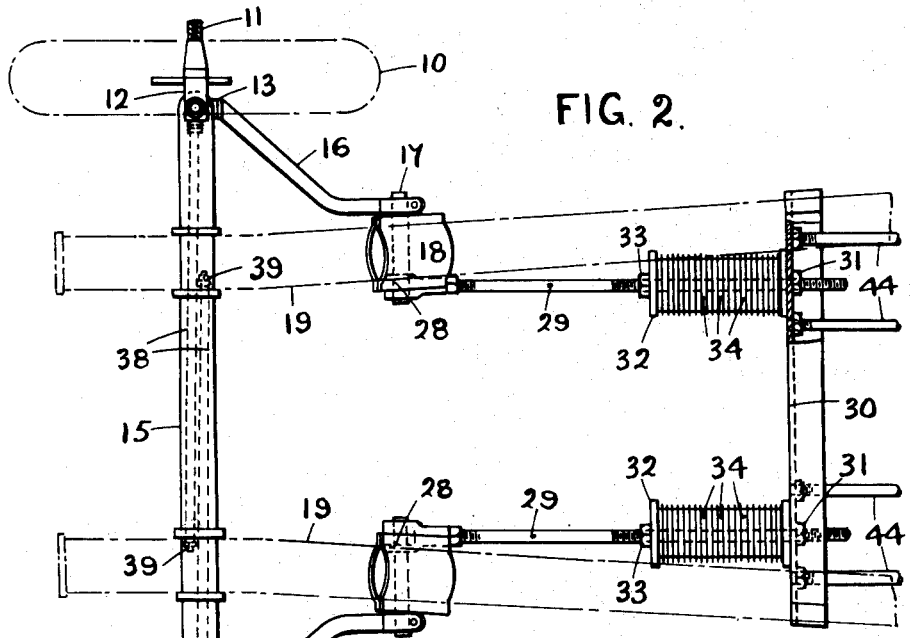
Figure 3:
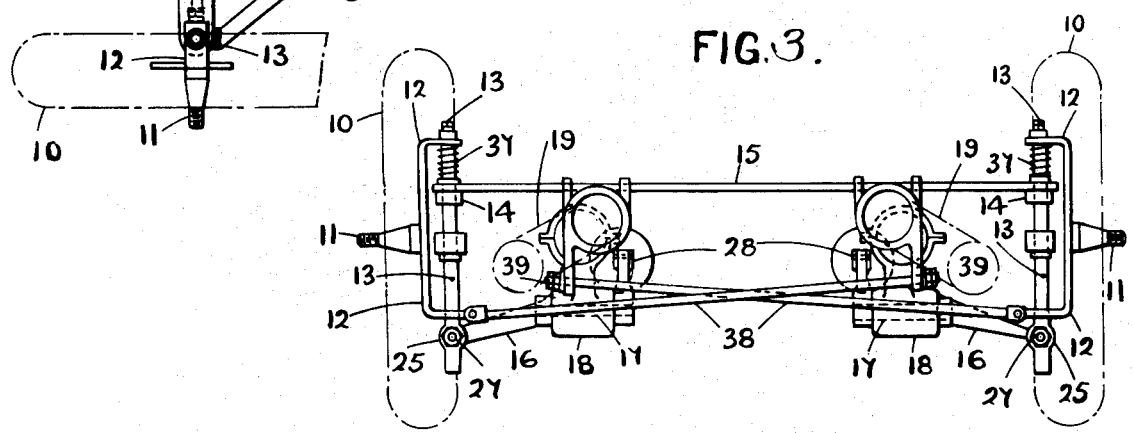

The accompanying drawings illustrate resilient suspensions in accordance with my invention. In the drawings, Figure 1 is a side elevation and Figure 2 a plan of the front half of one construction; and Figure 3 is an elevation looking on the front end thereof; Figure 4 is an enlarged side elevation, partly in section, of the connection at the lower end of the front stub axle; Figure 5 is an enlarged side elevation, partly in section, of one of the resilient devices; Figure 6 is a part view similar to Figure 1 illustrating a modification.

Referring to Figs. 1, 2, 3, 4 and 5 of the said drawings, in the example therein illustrated, each of the front wheels 10 is mounted as usual on a stub axle 11 the jaws 12 of which are attached to a king pin 13 which is mounted in a bearing 14 supported by a front cross member 15 carried by the chassis frame (which is indicated by dot-and-dash lines 19), said bearing permitting the necessary steering rotation of the wheel about the axis of the pin 13 under the control of the usual steering gear (not shown).

For the purpose of taking the lateral strains of the front wheels 10 and to retain them in proper relative position, a pair of transversely disposed radius rods 38 are pivotally connected at one end to the lower jaws 12 of the stub axles 11 and are pivotally attached at their other ends to brackets 39 at opposite sides of the chassis frame 19, said rods 38 crossing at the front of the vehicle. The front wheels, as they rise and fall, thus pivot about the points where the radius rods are attached to the brackets 39, but, as the radius rods are comparatively long, the radial movement is negligible.

The lower end of the king pin 13 (or it may be the lower jaw of the stub axle 11) is pivotally connected to the end of a substantially horizontal arm 16 fixed on a short transverse shaft 17 mounted in a bearing 18 on the chassis frame 19. In the example illustrated, the forward end of the arm 16 is reduced and fitted with a radiused shoe 20 secured by a pin 21. Referring particularly to Fig. 4, the reduced portion 22 of the arm 16 passes freely through a ball 23 in a socket 24 in a boss 25 at the lower end of the king pin 13. A spring 26, adjustable by a nut 27 on the threaded end of the reduced portion 22 of the arm 16, bears on the face of the boss 25 and forces the king pin 13 against the radiused face of the shoe 20, a direct thrust between the king pin and the shoe being thus maintained during the rise and fall of the king pin although the shoe travels through an arc about the axis of the shaft 17 whereon the arm 16 is mounted.

A crank 28 is also keyed on the shaft 17 so that the rise and fall of the king pin 13 and hence of the stub axle 11 and wheel 10 is transmitted by the arm 16 to said crank. Attached to the upper end of said crank is a rod 29, the other end of which passes through a fixed abutment or transverse member 30 on the chassis frame 19 which serves as a guide, said rod being fitted with a nut 31 which is adjustable on the rod and acts as a stop to limit the expansion of the resilient device. The rod 29 is also fitted with a washer 32 and nut 33 forming an adjustable abutment. The washer 32 bears on a series of rubber discs 34 which form the resilient devices and are threaded on the rod 29 and compressed between said washer and the fixed abutment 30. Fibre or other washers 35 may be interposed between adjacent rubber discs, if desired, and, as shown in Fig. 5, flanged sleeves 36 lined with lignum vitæ may be inserted at intervals in the series of discs to bear on the rod 29 and prevent the inner peripheries of the rubber discs coming into contact with the rod 29 and creating undue friction by rubbing thereon.

It will be seen that the vertical oscillations of either of the front wheels 10 due to irregularities of the road surface or obstructions thereon are independently transmitted by its stub axle 11, the king pin 13, arm 16, rocking shaft 17, crank 28 and rod 29 to the rubber discs 34 forming the resilient device associated with said wheel whereby said oscillations are absorbed, the suspension of each front wheel being independent of the other.

As applied to the rear wheels 40 of the vehicle, a similar construction is employed except that the radius rods are dispensed with.

The compression of the rubber discs 34 under the normal chassis load can be initially adjusted during erection by tightening up or slackening off the nut 33 behind the washer 32. A shorter series of rubber discs or members and a washer may be inserted between the nut 31 and the fixed abutment 30 to take the weight of the unsprung load and retard the lift of the chassis when the latter develops an upward movement due to road shock. Alternately, the lift-retarding device may be a separate series of rubber discs or a spring or springs coacting with the crank 28, but, as regards the front wheels, I prefer to employ for this purpose a spring 37 disposed around the king pin 13 between the upper jaw 12 of the stub axle 11 and the front cross member 15 through which the king pin passes.

It will be seen that the use of short arms or cranks such as 28 reduces inertia and vibration in the suspension as the movements of said cranks and hence of the rods 29 are small compared with the vertical movements of the road wheels. While each separately sprung wheel is free to reciprocate to the full extent of the undulations of the road, the rods 29 coacting with the resilient devices of the suspension reciprocate to only a fraction of the extent of the reciprocations of the road wheels. Further the resilient devices take the load only and are not subject to any lateral strains.

While I prefer to employ rubber discs 34 as the resilient devices, it will be obvious that springs or pneumatic shock-absorbing devices may be substituted for or employed in conjunction with said rubber discs. For example, and as shown in Fig. 6, the arm 16 may fulcrum on a pin 55 to which is fixed one end of a quarter elliptical spring 56, the pin 55 being journalled in a bracket 57 depending from the chassis frame member 19, and the other end of the spring being received in a slot in a bracket 58 also depending from the member 19. Rotation of the pin 55 under the action of the rocking lever 16 bends the spring 56 which bears in the bracket 58. The cross bar of the bracket 58 on which the spring 56 bears may be vertically adjustable in said bracket in any convenient manner.

Further, the arm 16 connected to the king pin 13 or to the lower jaw 12 of the stub axle 11 may be in one with the crank 28, and the rod 29 attached to said crank may be disposed in front of or behind said crank and in any convenient position in relation to the chassis side member 19.

In the construction forming my present invention, the resilient suspension for each wheel is an independent component which can be readily attached to the usual tubular or channel section side frames of the chassis without modification of said frames, and can be adjusted to suit the normal chassis load. Or, if desired, where the resilient devices of Figs. 1, 2, and 5 are employed, they may be enclosed within the chassis frame members 19.

What I claim and desire to secure by Letters Patent is:—

1. In combination with the chassis and wheels of a motor road vehicle, stub axles supporting the wheels, king pins carrying said stub axles, means for guiding said king pins so that they rise and fall vertically with said wheels, said means comprising long radius rods pivotally connected at one end to the stub axles and at their other ends to brackets carried by the chassis frame, said radius rods being anchored at the opposite side of the centre line of the vehicle to the stub axles to which they are connected, longitudinal arms resiliently connected at one end to the lower ends of said king pins and at their other ends to short cranks, bearings on said chassis supporting the fulcrums of said cranks, and longitudinally disposed resilient devices carried by said chassis and coacting with said cranks to absorb the rise and fall of said king pins and wheels.

2. In combination with the chassis and wheels of a motor road vehicle, stub axles supporting the wheels, king pins carrying said stub axles, means for guiding said king pins so that they rise and fall vertically with said wheels, said means comprising long radius rods pivotally connected at one end to the stub axles and at their other ends to brackets carried by the chassis, said radius rods being anchored at the opposite side of the centre line of the vehicle to the stub axles to which they are connected, longitudinal arms resiliently connected at one end to the lower ends of said king pins and at their other ends to short cranks, bearings on said chassis supporting the fulcrums of said cranks, and longitudinally disposed resilient devices carried by said chassis and coacting with said cranks to absorb the rise and fall of said king pins and wheels, the connection between the lower end of each king pin and the associated longitudinal arm comprising a radiused shoe bearing on said pin, a ball-and-socket connection between said arm and the lower end of said pin, and a spring bearing on said pin in opposition to said shoe.

3. In combination with the chassis and wheels of a motor road vehicle, stub axles supporting the wheels, king pins carrying said stub axles, means for guiding said king pins so that they rise and fall vertically with said wheels, said means comprising long radius rods pivotally connected at one end to the stub axles and at their other ends to brackets carried by the chassis, said radius rods being anchored at the opposite side of the centre line of the vehicle to the stub axles to which they are connected, longitudinal arms resiliently connected at one end to the lower ends of said king pins and at their other ends to short cranks, bearings on said chassis supporting the fulcrums of said cranks, and longitudinally disposed resilient devices carried by said chassis and coacting with said cranks to absorb the rise and fall of said king pins and wheels, the connection between the lower end of each king pin and the associated longitudinal arm comprising a radiused shoe bearing on said pin, a ball-and-socket connection between said arm and the lower end of said pin, and a spring bearing on said pin in opposition to said shoe, said resilient devices each comprising a series of rubber discs disposed between an adjustable washer on a rod connected to said crank and a fixed abutment on the chassis, fibre washers interposed between adjacent rubber discs, and flanged sleeves lined with lignum vitæ inserted at intervals in the series of discs to bear on said rod.

4. In combination with the chassis and wheels of a motor road vehicle, stub axles supporting the wheels, king pins carrying said stub axles, means for guiding said king pins so that they rise and fall vertically with said wheels, said means comprising long radius rods pivotally connected at one end to the stub axles and at their other ends to brackets carried by the chassis, said radius rods being anchored at the opposite side of the centre line of the vehicle to the stub axles to which they are connected, longitudinal arms resiliently connected at one end to the lower ends of said king pins and at their other ends to short cranks, bearings on said chassis supporting the fulcrums of said cranks, and longitudinally disposed resilient devices carried by said chassis and coacting with said cranks to absorb the rise and fall of said king pins and wheels, the connection between the lower end of each king pin and the associated longitudinal arm comprising a radiused shoe bearing on said pin, a ball-and-socket connection between said arm and the lower end of said pin, and a spring bearing on said pin in opposition to said shoe, said resilient devices each comprising a series of rubber discs disposed between an adjustable washer on a rod connected to said crank and a fixed abutment on the chassis, fibre washers interposed between adjacent rubber discs, and flanged sleeves lined with lignum vitæ inserted at intervals in the series of discs to bear on said rod, and a spring disposed around the upper end of each king pin between the upper jaw of the stub axle and the chassis member which guides the upper end of said king pin.

In testimony whereof, I affix my signature.

DONALD BROWN.